(12) United States Patent
Bai et al.

(10) Patent No.: US 12,596,261 B2
(45) Date of Patent: Apr. 7, 2026

(54) EXTENDED REALITY DEVICE AND CONTROL METHOD THEREOF

(71) Applicant: Beijing Zitiao Network Technology Co., Ltd., Beijing (CN)

(72) Inventors: Wenlong Bai, Beijing (CN); Jiu Xia, Beijing (CN); Yu Xia, Beijing (CN); Benyi Zhang, Beijing (CN); Peng Du, Beijing (CN); Guanghui Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 36 days.

(21) Appl. No.: 18/604,055

(22) Filed: Mar. 13, 2024

(65) Prior Publication Data

US 2024/0310643 A1 Sep. 19, 2024

(30) Foreign Application Priority Data

Mar. 13, 2023 (CN) .......................... 202310266147.4

(51) Int. Cl.
| | |
|---|---|
| *G02B 27/01* | (2006.01) |
| *G06T 19/00* | (2011.01) |

(52) U.S. Cl.
CPC ........ *G02B 27/0176* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2012/0268433 | A1* | 10/2012 | Horii | ................. G02B 27/0149 345/204 |
| 2022/0260832 | A1* | 8/2022 | Yang | ................. G02B 27/0172 |
| 2022/0326772 | A1 | 10/2022 | Forsland et al. | |
| 2023/0204965 | A1 | 6/2023 | Park et al. | |
| 2024/0103289 | A1 | 3/2024 | Yoon et al. | |

FOREIGN PATENT DOCUMENTS

| | | |
|---|---|---|
| CN | 108333772 A | 7/2018 |
| WO | 2022/055118 A1 | 3/2022 |
| WO | 2022/255682 A1 | 12/2022 |

OTHER PUBLICATIONS

European Search Report for EP Patent Application No. 24163359.3, Issued on Aug. 5, 2024, 11 pages.
Office Action received for European Application No. 24163359.3, mailed on Jun. 3, 2025, 11 pages.

* cited by examiner

*Primary Examiner* — Christopher J Kohlman

(57) ABSTRACT

The present disclosure provides an extended reality device and a control method thereof. The extended reality device includes: a front part and a rear part; the front part comprising: a display module, configured to display extended reality image; the rear part comprising: a system controller connected to the display module and configured to control operation of the display module; a battery connected to the system controller and configured to supply power to each electrical device. Through the above solution, transferring the system controller and the battery to the rear part setting, so that the weight of the front part of the extended reality device is significantly reduced, the thickness of the front part is significantly reduced, the weight of the rear part and the front part can be balanced, there is no bias when user wears the extended reality device, which improves the user's wearing comfort.

16 Claims, 9 Drawing Sheets

REAR PART2      FRONT PART1

BATTERY 2-2

SYSTEM CONTROLLER 2-1

DIS-PLAY MOD-ULE 1-1

REAR PART2      FRONT PART1

BATTERY 2-2

SYSTEM CONTROLLER 2-1

1-2-2    FIRST MI-CRO-PRO-CES-SOR 1-2    1-2-1

DIS-PLAY MOD-ULE 1-1

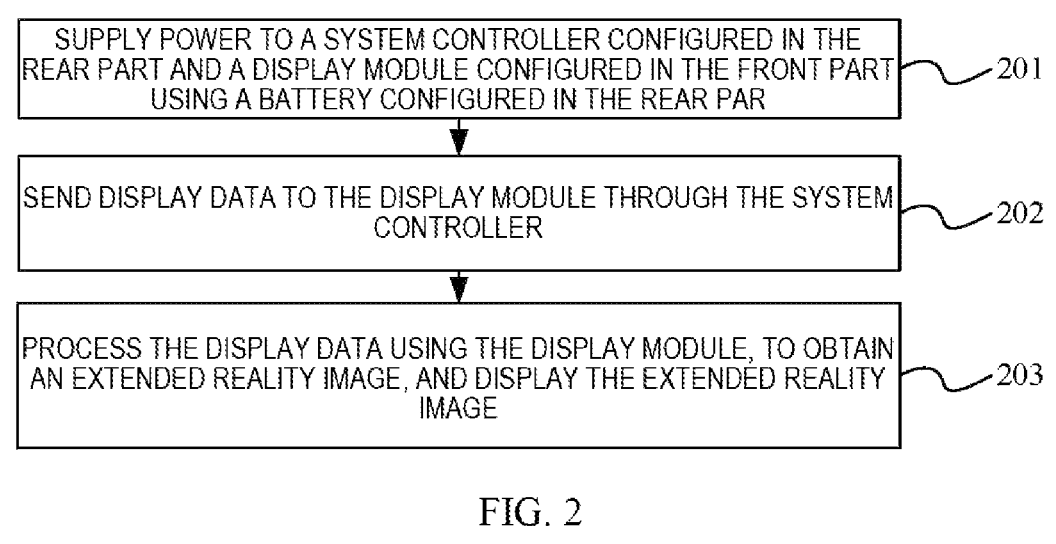

SUPPLY POWER TO A SYSTEM CONTROLLER CONFIGURED IN THE REAR PART AND A DISPLAY MODULE CONFIGURED IN THE FRONT PART USING A BATTERY CONFIGURED IN THE REAR PAR ⌇ 201

SEND DISPLAY DATA TO THE DISPLAY MODULE THROUGH THE SYSTEM CONTROLLER ⌇ 202

PROCESS THE DISPLAY DATA USING THE DISPLAY MODULE, TO OBTAIN AN EXTENDED REALITY IMAGE, AND DISPLAY THE EXTENDED REALITY IMAGE ⌇ 203

FIG. 2

EXTENDED REALITY DEVICE AND CONTROL METHOD THEREOF

CROSS-REFERENCE

The present disclosure claims priority to Chinese Patent Application No. 202310266147.4, filed on Mar. 13, 2023 and entitled "EXTENDED REALITY DEVICE AND CONTROL METHOD THEREOF", the entirety of which is incorporated herein by reference.

FIELD

The present disclosure relates to the field of electronic equipment, and more particularly, to an extended reality device and a control method thereof.

BACKGROUND

With the rapid development of the extended reality industry, the scope of application has gradually become more popular, and higher requirements have been put forward for the wearing comfort of extended reality devices.

In the existing technology, for extended reality devices, the main structure is generally arranged at the front part of the forehead, which causes the weight to be concentrated on the front part and makes the thickness of the front part relatively thick. It affects the appearance of the extended reality device and the comfort of wearing it.

SUMMARY

In view of this, the purpose of the present disclosure is to propose an extended reality device and a control method thereof to solve or partially solve the above technical problems.

Based on the above purpose, a first aspect of the present disclosure provides an extended reality device, comprising: a front part and a rear part; the front part comprising: a display module, configured to display extended reality image; the rear part comprising: a system controller connected to the display module and configured to control operation of the display module; a battery connected to the system controller and configured to supply power to each electrical device.

Based on the same inventive concept, a second aspect of the present disclosure proposes a control method for an extended reality device. The extended reality device comprises: a front part and a rear part. The method comprising: supplying power to a system controller configured in the rear part and a display module configured in the front part using a battery configured in the rear part; sending display data to the display module through the system controller; and processing the display data using the display module, to obtain an extended reality image, and displaying the extended reality image.

Based on the same inventive concept, a third aspect of the present disclosure proposes a non-transitory computer readable storage medium having a computer program stored thereon which is executable by a processor to implement acts comprising: supplying power to a system controller configured in the rear part and a display module configured in the front part using a battery configured in the rear part; sending display data to the display module through the system controller; and processing the display data using the display module, to obtain an extended reality image, and displaying the extended reality image.

As can be seen from the above, the extended reality device and the control method thereof provided by the present disclosure can divide the extended reality device into front part and rear part, and configure the display module in the front part, and configure the system controller and battery in the rear part, supply power the overall electrical device using the battery, and control the display module through the system controller, so that the display module can perform extended reality display in the front part. Through the above solution, the system controller and the battery are transferred into the rear part setting, so that the weight of the front part of the extended reality device is significantly reduced, the thickness of the front part is significantly reduced, the weight of the rear part and the front part can be balanced, there is no bias when user wears the extended reality device, which improves wearing comfort of the user.

BRIEF DESCRIPTION OF THE DRAWINGS

In order to explain the technical solutions in the present disclosure or related technologies more clearly, the drawings needed to be used in the embodiments or related technical descriptions will be briefly introduced below. Obviously, the drawings in the following description are only the embodiments of the present disclosure, for those of ordinary skill in the art, other drawings can also be obtained based on these drawings without exerting creative efforts.

FIG. 2 is a flowchart of a control method of an extended reality device of embodiments of the present disclosure.

DENOTATIONS OF THE REFERENCE NUMERALS

Figures 1A, 1B:
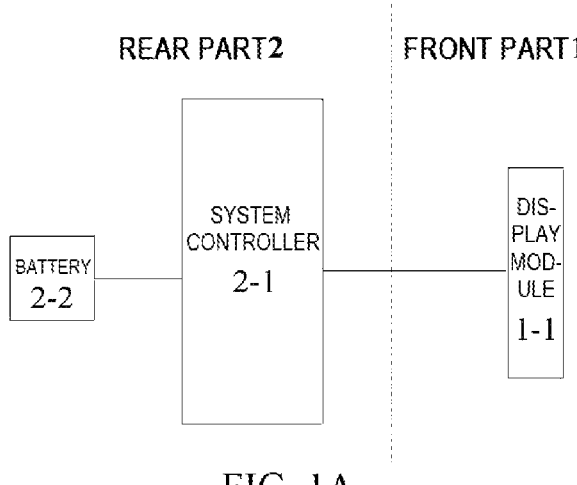
FIG. 1A is a block diagram of a circuit structure for an extended reality device of a first embodiment of the present disclosure.
FIG. 1B is a block diagram of a circuit structure for an extended reality device of a second embodiment of the present disclosure.

1 Front part;
1-1 Display module; 1-1-1 Display control interface; 1-1-2 Display transport interface;
1-2 First microprocessor; 1-2-1 Display operation interface; 1-2-2 First system control interface;
1-3 Image capturing module; 1-3-1 Capturing control interface; 1-3-2 Image transport interface;
1-4 Second microprocessor; 1-4-1 Image capturing operation interface; 1-4-2 Second system control interface;
1-5 Sensor;
1-6 Audio module; 1-6-1 Audio control interface; 1-6-2 Audio transport interface;
2 Rear part;
2-1 System controller; 2-2 Battery, 2-3 Battery management module; 2-4 Wireless communication module;
2-5 External device interface.

DETAILED DESCRIPTION

It can be understood that the data involved in this technical solution (comprising but not limited to the data itself, the obtaining or use of the data) should comply with the requirements of corresponding laws and related regulations.

It should be noted that, unless otherwise defined, the technical terms or scientific terms used in embodiments of the present disclosure should have the usual meanings understood by those with ordinary skills in the field to which the present disclosure belongs. The terms "first", "second" and similar terms used in the present disclosure do not indicate any order, quantity or importance, but are only used to distinguish different components. Words such as "include" or "comprising" mean that the elements or things appearing before the word include the elements or things listed after the word and their equivalents, without excluding other elements or things. Words such as "connected" or "linked" are not limited to physical or mechanical connections, but may comprise electrical connections, whether direct or indirect. "Up", "down", "left", "right", etc. are only used to express relative positional relationships, when the absolute position of the described object changes, the relative positional relationship may also change accordingly.

The principles and spirit of the present disclosure will be described below with reference to several exemplary embodiments. It should be understood that these embodiments are only provided to enable those skilled in the art to better understand and implement the present disclosure, but are not intended to limit the scope of the present disclosure in any way. On the contrary, these embodiments are provided so that this disclosure will be thorough and complete, and will fully convey the scope of the disclosure to those skilled in the art.

In this article, it is to be understood that any number of elements in the drawings is for illustration and not limitation, and any naming is for distinction only and does not have any limiting meaning.

Based on the above description of background, the following situations still exist in related technologies:

Some extended reality devices, in order to ensure the appearance and wearing comfort, will set the battery on the back head pad of the extended reality device. Moving the battery position back can achieve better weight balance, and can also reduce the thickness of the front part host to achieve better aesthetics and wearing comfort, so it has been widely used.

However, the thinness and wearing comfort of the above-mentioned solution are still not very good, in order to further reduce the thickness of the extended reality device front part, increase the aesthetic effect, and improve the user's wearing comfort, the solutions of the following specific embodiments of the present disclosure are adopted to realize.

Based on the above description, the principles and spirit of the present disclosure will be explained in detail below with reference to several representative embodiments of the present disclosure.

FIG. 1A shows a block diagram of a circuit structure for a first embodiment of the present disclosure.

Embodiments of the present disclosure provides an extended reality device, as shown in FIG. 1A, comprising: a front part 1 and a rear part 2. The front part 1 comprising: a display module 1-1, which is configured to display extended reality image. The rear part 2 comprising: a system controller 2-1 which is connected to the display module 1-1 and configured to control operation of the display module 1-1; a battery 2-2 which is connected to the system controller 2-1 and configured to supply power to each electrical device.

During specific implementation, setting the display module 1-1 in the front part 1, setting the system controller 2-1 and the battery 2-2 in the rear part 2, supply power to the overall electrical device using the battery 2-2, and control the display module 1-1 through the system controller 2-1 module 1-1, so that display module 1-1 can perform extended reality display in the front part 1.

In some embodiments, the display module 1-1 is set in the shell of front part 1, system controller 2-1 and battery 2-2 are set in the shell of rear part 2, and the shell of front part 1 and the shell of rear part 2 are connected through a connecting shell, wherein the connecting shell is provided with a connection circuits between the electrical devices of the front part 1 and the rear part 2. Herein, the display module adopts an LCD (Liquid Crystal Display) module, and the system controller adopts a SOC (System on Chip) Main Processer.

Through the above solution, transferring both the system controller 2-1 and the battery 2-2 to the rear part 2 setting, so that the weight of the front part 1 of the extended reality device is significantly reduced, and the thickness of the front part 1 is significantly reduced. Due to the special shape of the human head, when the user wears the extended reality device, the height of front part 1 is higher and the height of rear part 2 is lower. The solution of the present disclosure configures the relatively heavy system controller 2-1 and battery 2-2 to the rear part 2, so that the weight balance between the rear part 2 and the front part 1 is better after the user wears it, thereby improving the user's wearing comfort.

All operational data and display data of the display module 1-1 are controlled through system controller 2-1, so that various interfaces of display module 1-1 are connected to system controller 2-1, so that there are more connected circuits.

FIG. 1B shows a block diagram of a circuit structure for a second embodiment of the present disclosure.

In some embodiments, in order to reduce the circuit connecting the display module 1-1 of front part 1 and the system controller 2-1 of rear part 2, as shown in FIG. 1B, the front part 1 further comprises a first microprocessor 1-2 which is provided with a display operation interface 1-2-1 and a first system control interface 1-2-2. The display operation interface 1-2-1 is connected to the display module 1-1, and the first microprocessor 1-2 controls operational data of the display module 1-1 through the display operation interface 1-2-1. The first system control interface 1-2-2 is connected to the system controller 2-1, and the system controller 2-1 controls operational data of the first microprocessor 1-2 through the first system control interface 1-2-2.

During specific implementation, the first microprocessor 1-2 is provided with a connection interface of a user controller (for example, a handle), connecting to the user controller through the connection interface, so that the user send a control signal through the user controller, thereby obtaining the display operation control signal through the first microprocessor 1-2 processing, sending the display operation control signal to the display module 1-1 through the display operation interface 1-2-1, so that the display module 1-1 adjusts the operational data according to the display operation control signal. Herein, the first microprocessor 1-2 adopts MCU (Microcontroller Unit), such as MCU2 in FIG. 1P; the operational data of display module 1-1 comprises at least one of the following: brightness, clarity, color contrast, display size, resolution, the initialization data of display module 1-1 and the reset data of display module 1-1, etc.

During specific implementation, the first microprocessor 1-2 may also be connected to the system controller 2-1 through the first system control interface 1-2-2, so that operational data of first microprocessor 1-2 can be controlled through system controller 2-1. The operational data of first microprocessor 1-2 comprises at least one of the following: memory, sleep signal, power supply signal, etc.

Through the above solution, setting the first microprocessor 1-2 in the front part 1 to control the operation of the display module 1-1, so that the number of connection circuits between the display module 1-1 and the system controller 2-1 of the rear part 2 can be reduced, so that the extended reality device easier manufacturing, and manufacturing costs is reduced.

Figure 1C:
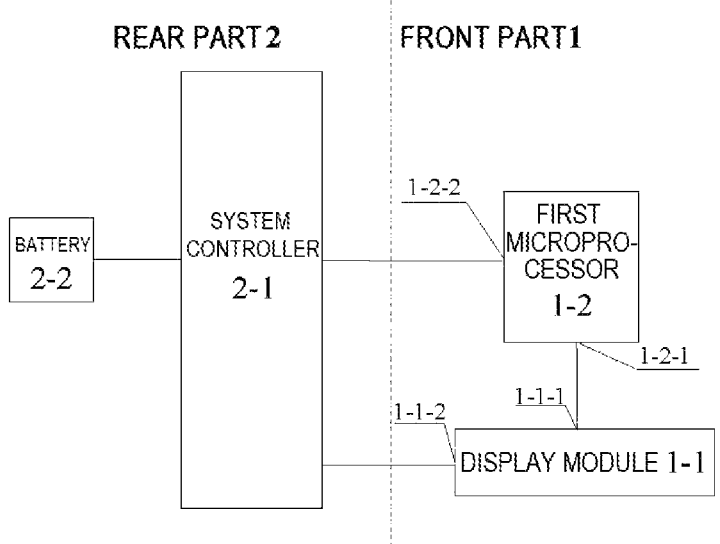
FIG. 1C is a block diagram of a circuit structure for an extended reality device of a third embodiment of the present disclosure.

FIG. 1C shows a block diagram of a circuit structure for a third embodiment of the present disclosure.

Figure 1D:
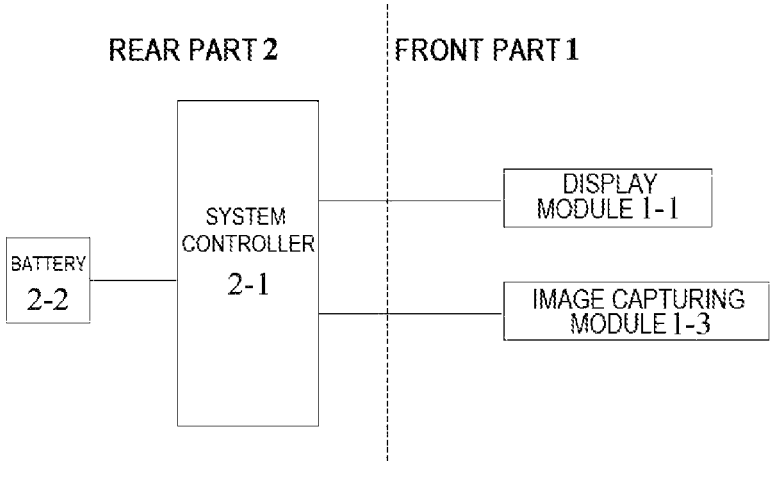
FIG. 1D is a block diagram of a circuit structure for an extended reality device of a fourth embodiment of the present disclosure.
Figure 1E:
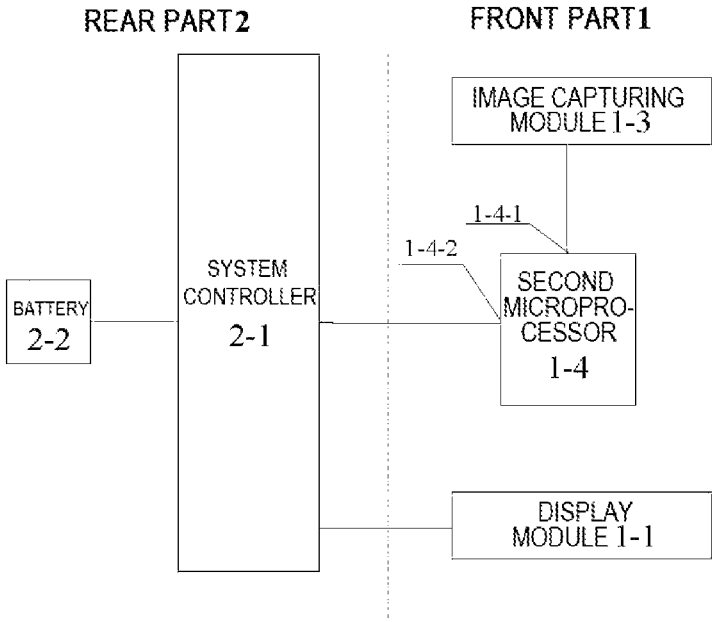
FIG. 1E is a block diagram of a circuit structure for an extended reality device of a fifth embodiment of the present disclosure.
Figure 1F:
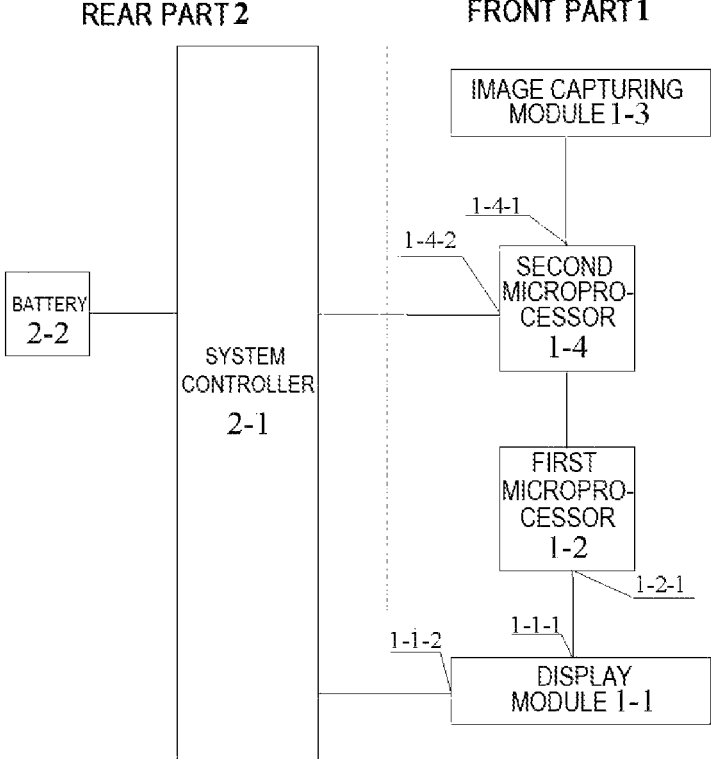
FIG. 1F is a block diagram of a circuit structure for an extended reality device of a sixth embodiment of the present disclosure.
Figure 1G:
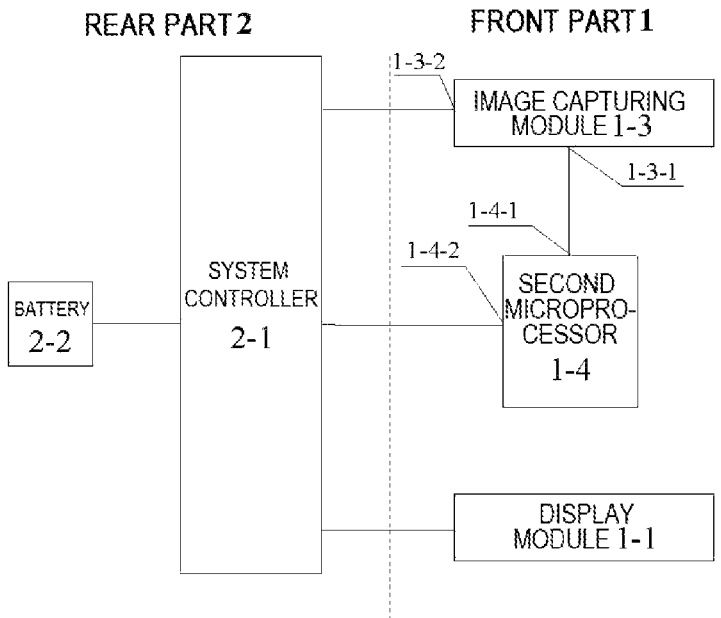
FIG. 1G is a block diagram of a circuit structure for an extended reality device of a seventh embodiment of the present disclosure.
Figure 1H:
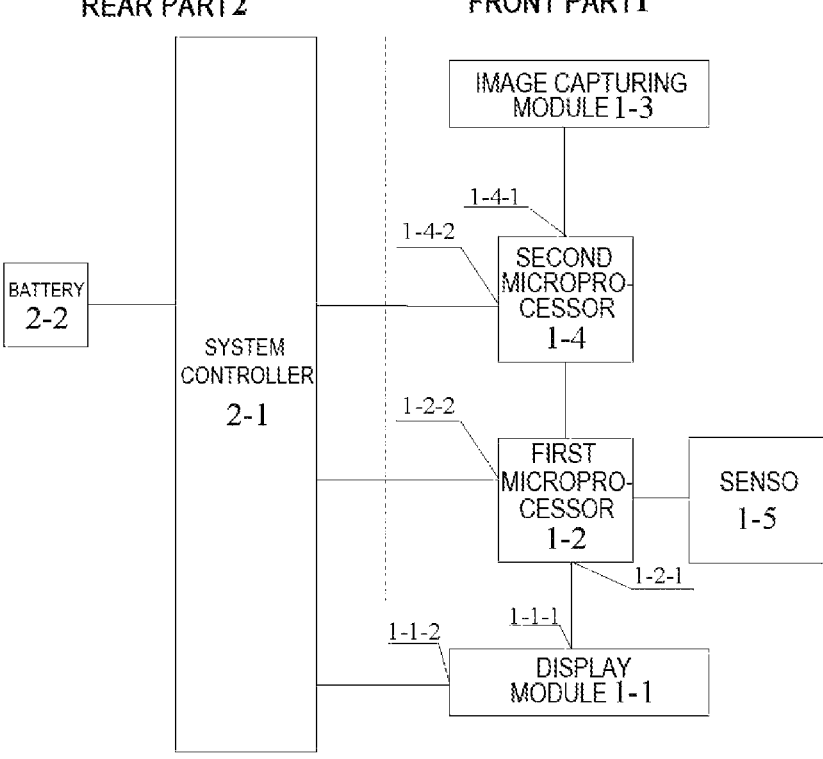
FIG. 1H is a block diagram of a circuit structure for an extended reality device of an eighth embodiment of the present disclosure.
Figure 1I:
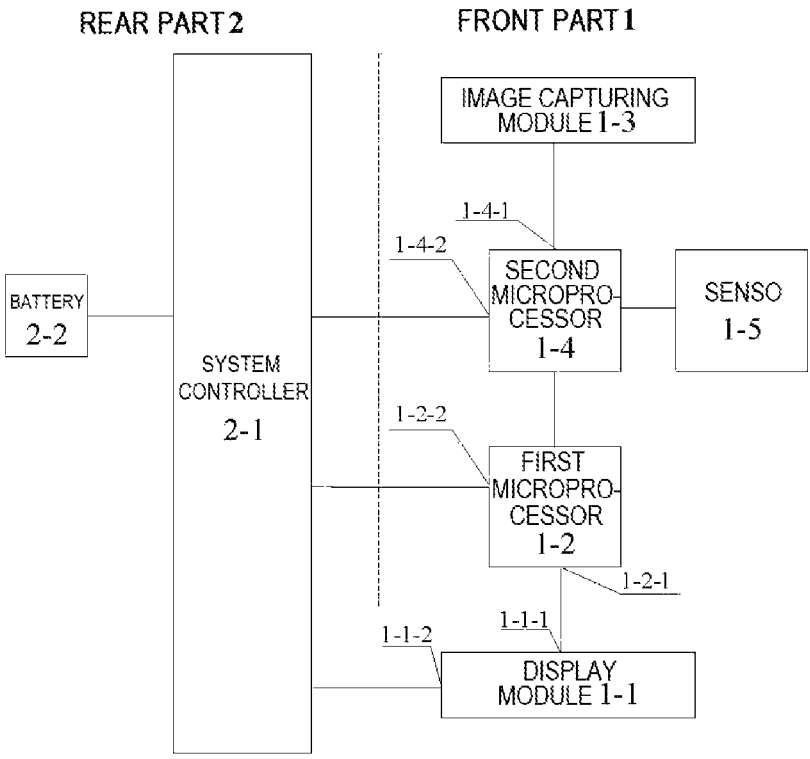
FIG. 1I is a block diagram of a circuit structure for an extended reality device of a ninth embodiment of the present disclosure.
Figure 1J:
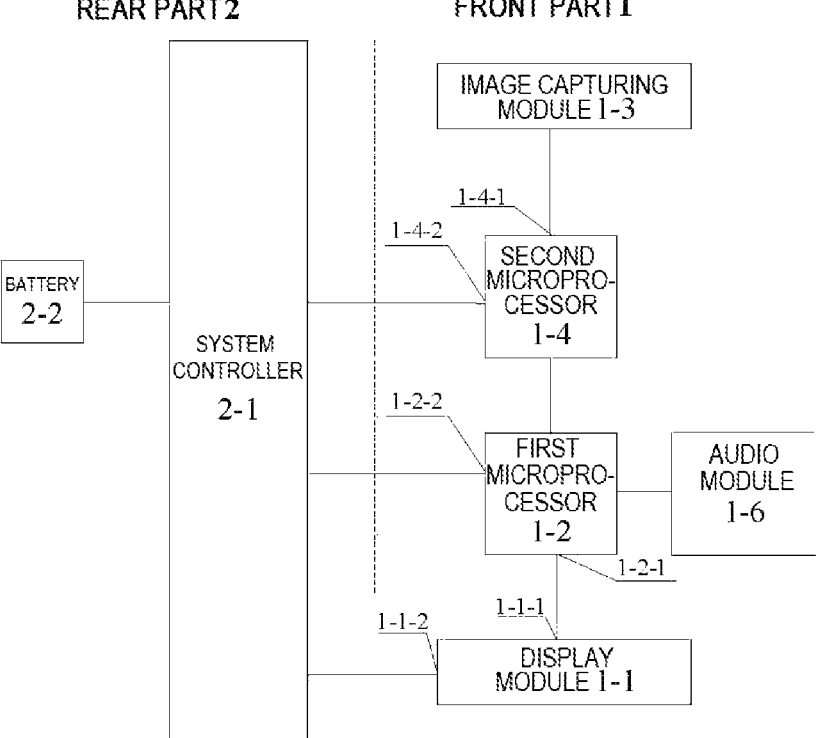
FIG. 1J is a block diagram of a circuit structure for an extended reality device of a tenth embodiment of the present disclosure.
Figure 1K:
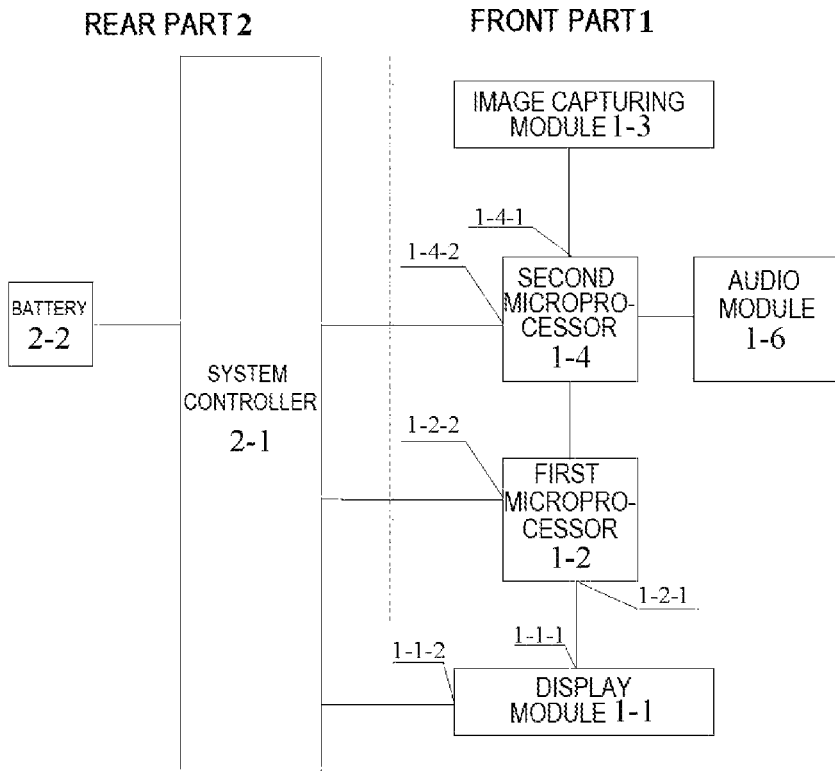
FIG. 1K is a block diagram of a circuit structure for an extended reality device of an eleventh embodiment of the present disclosure.
Figure 1L:
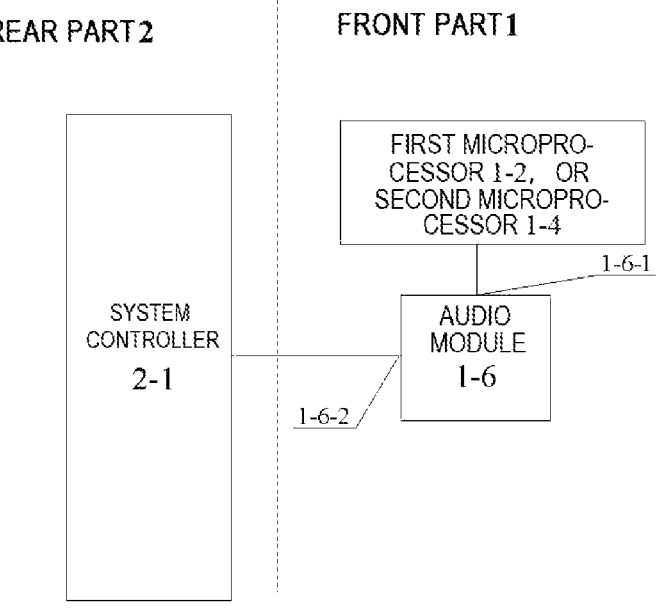
FIG. 1L is a block diagram of a circuit connection for an audio module in a twelfth embodiment of the present disclosure.
Figure 1M:
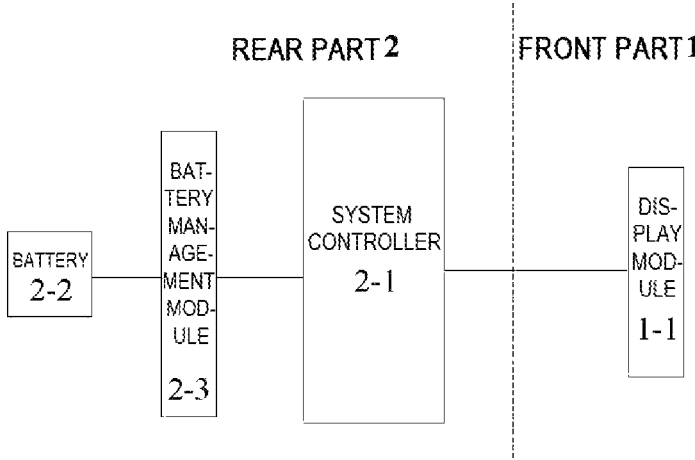
FIG. 1M is a block diagram of a circuit structure for an extended reality device of a thirteenth embodiment of the present disclosure.
Figure 1N:
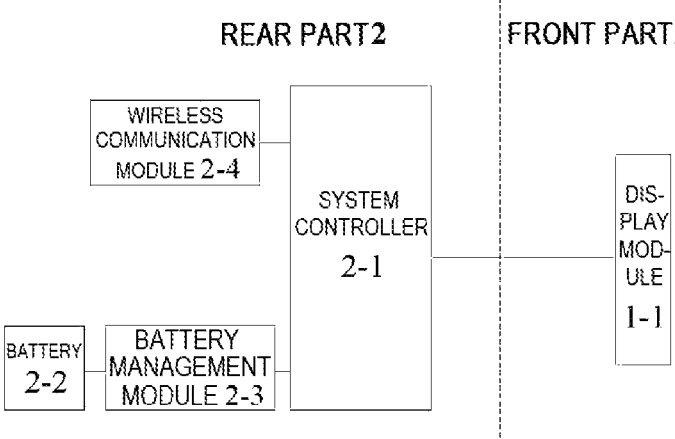
FIG. 1N is a block diagram of a circuit structure for an extended reality device of a fourteenth embodiment of the present disclosure.
Figure 1O:
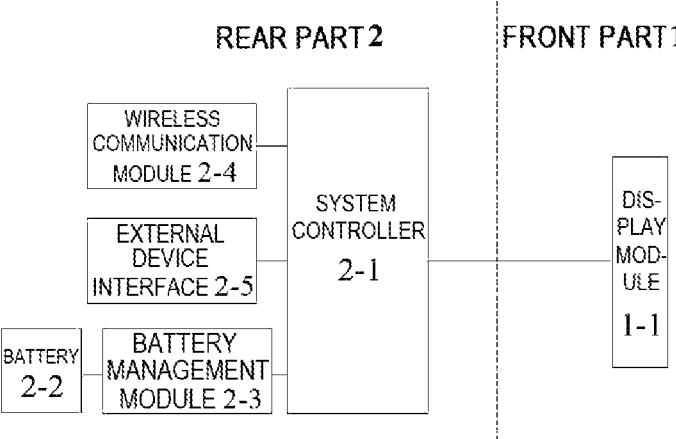
FIG. 1O is a block diagram of a circuit structure for an extended reality device of a fifteenth embodiment of the present disclosure.
Figure 1P:
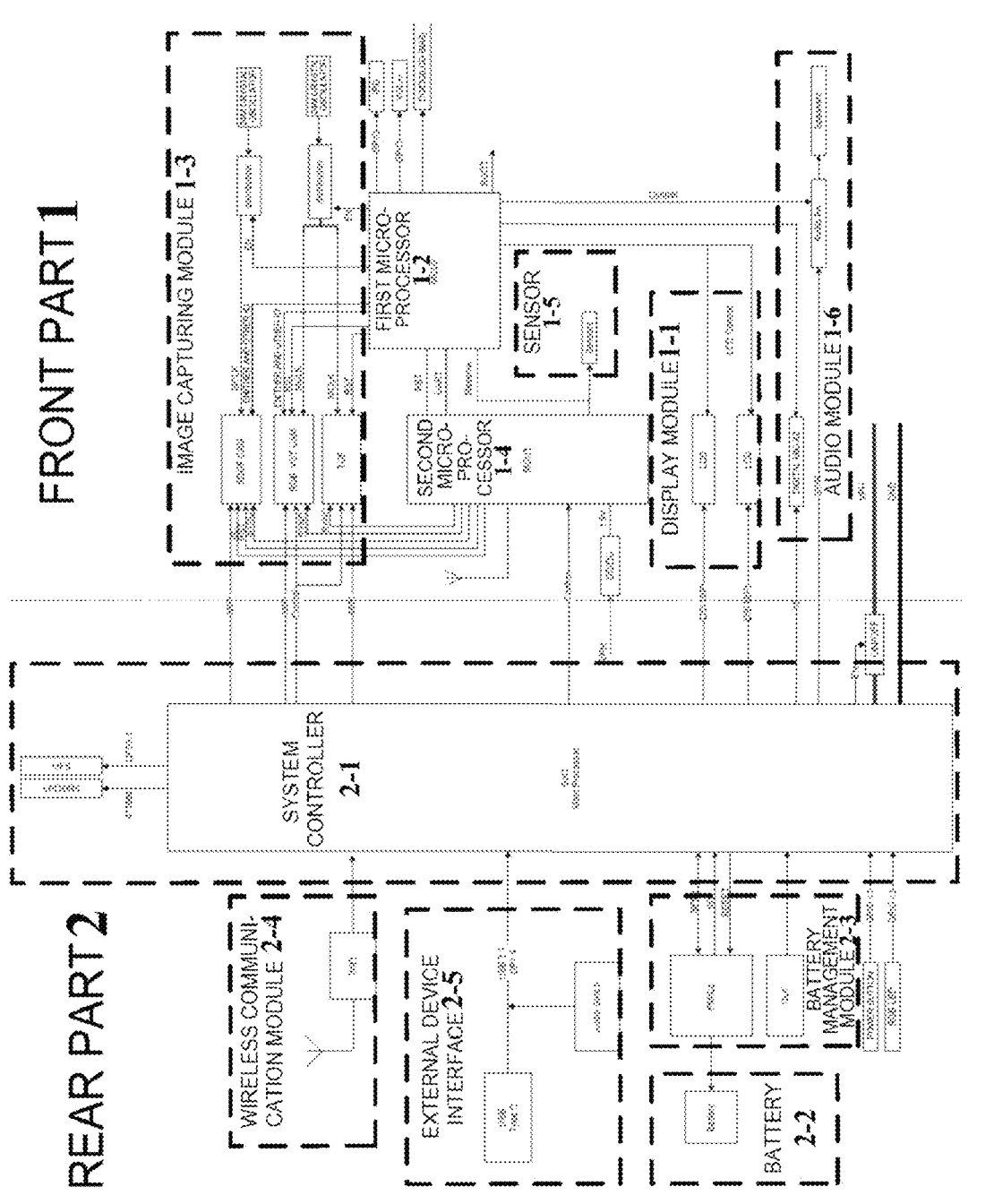
FIG. 1P is a diagram of a circuit structure for an extended reality device of a specific embodiment of the present disclosure.

FIG. 1P is a diagram of a circuit structure for the extended reality device of a specific embodiment in the present disclosure.

In some embodiments, as shown in FIG. 1C and FIG. 1P, the display module 1-1 is provided with a display control interface 1-1-1 and a display transport interface 1-1-2. The display control interface 1-1-1 is connected to the display operation interface 1-2-1 of the first microprocessor 1-2, the first microprocessor 1-2 performs data communication with the display control interface 1-1-1 through the display operation interface 1-2-1 and controls the operational data of the display module 1-1. The display transport interface 1-1-2 is connected to the system controller 2-1, the system controller 2-1 sends a display data through the display transport interface 1-1-2 for the display module 1-1 to display the display data.

During specific implementation, the first microprocessor 1-2 is used to control operational data of the display module 1-1, the system controller 2-1 is used to send the display data to display module 1-1, the display module 1-1 converts the display data into an extended reality image to display for users to view.

Through the above solution, system controller 2-1 and the first microprocessor 1-2 are used to control the display module 1-1 respectively, which can reduce the number of connection circuits between the display module 1-1 and the system controller 2-1, and at the same time make the display of the display module 1-1 and accuracy and effect of operation control are better.

FIG. 1D shows a block diagram of a circuit structure for a fourth embodiment of the present disclosure.

In some embodiments, as shown in FIG. 1D, the front part 1 further comprises: an image capturing module 1-3 connected to the system controller 2-1 and configured to be controlled by the system controller 2-1 to capture image information.

During specific implementation, the image capturing module 1-3 may also be configured in the front part 1 of the extended reality device. The image capturing module 1-3 may control the image capture through the system controller 2-1, and send the captured image information to the system controller 2-1 to transmit, store or send it to the display module 1-1 for display.

Through the above solution, the image capturing module 1-3 may be added to the extended reality device, setting the image capturing module 1-3 in the front part 1, which can effectively ensure image capturing effect of the image capturing module 1-3.

During specific implementation, all operational data and image capturing data of the image capturing module 1-3 are controlled or received and processed through the system controller 2-1, so that various interfaces of the image capturing module 1-3 are connected to the system controller 2-1, so that there are more connected circuits.

In order to reduce circuits connecting the image capturing module 1-3 of the front part 1 and the system controller 2-1 of the rear part 2, the image capturing module 1-3 and the first microprocessor 1-2 may be connected, operational data of the image capturing module 1-3 is controlled through the first microprocessor 1-2, so that the circuits for connecting the image capturing module 1-3 of the front part 1 and the system controller 2-1 of the rear part 2 can be effectively reduced.

However, the operational data of the image capturing module 1-3 and the display module 1-1 need to be controlled by the first microprocessor 1-2, so that the first microprocessor 1-2 will process a larger amount of data, errors or freezes may occur.

FIG. 1E shows a block diagram of a circuit structure for a fifth embodiment of the present disclosure.

Based on the situation described above, in some embodiments, as shown in FIG. 1E and FIG. 1P, the front part 1 further comprises: a second microprocessor 1-4, which is provided with an image capturing operation interface 1-4-1 and a second system control interface 1-4-2. The image capturing operation interface 1-4-1 is connected to the image capturing module 1-3, and the second microprocessor 1-4 controls operational data of the image capturing module 1-3 through the image capturing operation interface 1-4-1. The second system control interface 1-4-2 is connected to the system controller 2-1, and the system controller 2-1 controls operational data of the second microprocessor 1-4 through the second system control interface 1-4-2.

During specific implementation, the second microprocessor 1-4 unit may also be connected to the first microprocessor 1-2, the first microprocessor 1-2 will send received control signal about the image capturing module 1-3 sent by the user to the second microprocessor 1-4. So that the second microprocessor 1-4 can control the operational data of the image capturing module 1-3. Herein, the second microprocessor 1-4 adopts MCU, such as MCU1 in FIG. 1P; the operational data of image capturing module 1-3 comprises at least one of the following: size enlargement, size reduction, image capture time, image capture mode, image capture reset data, etc.

FIG. 1F shows a block diagram of a circuit structure for a sixth embodiment of the present disclosure.

In addition, as shown in FIG. 1F and FIG. 1P, the first microprocessor 1-2 is connected to the system controller 2-1 through the second microprocessor 1-4. In this way, the system controller 2-1 can send the operation control information to the first microprocessor 1-2 through the second microprocessor 1-4, thereby adjust the operational data of the first microprocessor 1-2.

During specific implementation, the operational data of the second microprocessor 1-4 is controlled through the system controller 2-1. Herein, the operational data of the second microprocessor 1-4 comprises at least one of the following: a memory, a sleep signal, a power supply signal, etc.

Through the above solution, the second microprocessor 1-4 is added to the front part 1 to control the operation of the image capturing module 1-3, so that can effectively ensure the operation control effect of the image capturing module 1-3, it can also effectively reduce the number of connection circuits between the image capturing module 1-3 and the system controller 2-1 at the same time, thereby makes the extended reality device easier to manufacture and reduces manufacturing costs.

FIG. 1G shows a block diagram of a circuit structure for a seventh embodiment of the present disclosure.

In some embodiments, as shown in FIG. 1G and FIG. 1P, the image capturing module 1-3 is provided with a capturing control interface 1-3-1 and an image transport interface 1-3-2. The capturing control interface 1-3-1 is connected to the image capturing operation interface of the second microprocessor 1-4, the second microprocessor 1-4 performs data communication with the capturing control interface 1-3-1 through the image capturing operation interface 1-4-1 and controls operational data of the image capturing module 1-3. The image transport interface 1-3-2 is connected to the system controller 2-1, the system controller 2-1 receives image information captured by the image capturing module 1-3 through the image transport interface 1-3-2.

During specific implementation, the second microprocessor 1-4 is used to control the operational data of the image capturing module 1-3, system controller 2-1 is used to receive image information captured by the image capturing module 1-3. Then the system controller 2-1 processes the image information into display data and sends it to the display module 1-1, the display module 1-1 converts the display data into an extended reality image to display for the user to view.

Through the above solution, the system controller 2-1 and the second microprocessor 1-4 are used to jointly control the image capturing module 1-3, which can reduce the number of connection circuits between the image capturing module

1-3 and the system controller 2-1, so that the operation control effect of the image capturing module 1-3 is better.

In some embodiments, the image capturing module 1-3 may also connected to the first microprocessor 1-2, the first microprocessor 1-2 will obtain an overall control signal (for example, sleep signal) of each electrical device of the front part 1 and send the overall control signal to each electrical device connected to the first microprocessor 1-2 (comprising the image capturing module 1-3).

In some embodiments, the image capturing module 1-3 comprises at least one of the following: a tracking camera, a depth camera, or a perspective camera.

In specific implementation, as shown in FIG. 1P, the tracking camera is a 6DOF (degree of freedom) camera used to track specific graphics, the depth camera is a TOF (time of flight) camera used to capture depth information of images, the perspective camera is an RGB (Red Green Blue, red, green and blue pixel) VST (video see through, perspective) camera used to capture perspective images of surrounding environment.

Herein, the tracking camera, the depth camera and the perspective camera are provided with the corresponding capturing control interface 1-3-1 and the image transport interface 1-3-2, connection method of each camera to the second microprocessor 1-4 and the system controller 2-1 is the same as the above connection method of the image capturing module 1-3 and will not be described again here.

FIG. 1H shows a block diagram of a circuit structure for an eighth embodiment of the present disclosure.

FIG. 1I shows a block diagram of a circuit structure for a ninth embodiment of the present disclosure.

In some embodiments, as shown in FIG. 1H and FIG. 1I, the front part 1 further comprises: a sensor 1-5 which is connected to the first microprocessor 1-2 or the second microprocessor 1-4 and configured to control operational data of the sensor 1-5 through the first microprocessor 1-2 or the second microprocessor 1-4.

During specific implementation, the first microprocessor 1-2 may be used to control the operation of the sensor 1-5, the second microprocessor 1-4 may also be used to control the operation of the sensor 1-5. The specific operation process comprises: the first microprocessor 1-2 or the second microprocessor 1-4 sends a control signal for the sensor 1-5 to control the sensor 1-5 to start and capture sensing information, the sensor 1-5 sends a captured sensing information to the first microprocessor 1-2 or the second microprocessor 1-4, so that the first microprocessor 1-2 or the second microprocessor 1-4 processes the sensing information.

Herein, the sensor 1-5 comprising at least one of the following: a temperature sensor, a humidity sensor, a displacement sensor, a speed sensor, a brightness sensor, a sound sensor, and the like.

In some embodiments, since the amount of data that the first microprocessor 1-2 needs to process is relatively large, it is preferred to use the second microprocessor 1-4 to control the operation of the sensor 1-5 (as shown in FIG. 1I and FIG. 1P).

FIG. 1J shows a block diagram of a circuit structure for a tenth embodiment of the present disclosure.

FIG. 1K shows a block diagram of a circuit structure for an eleventh embodiment of the present disclosure.

In some embodiments, as shown in FIG. 1J and FIG. 1K, the front part 1 further comprises: an audio module 1-6 which is connected to the first microprocessor 1-2 or the second microprocessor 1-4 and configured to controlled by the first microprocessor 1-2 or the second microprocessor 1-4 to control operational data of the audio module 1-6.

During specific implementation, the first microprocessor 1-2 may be used to control the operation of audio module 1-6, and the second microprocessor 1-4 may also be used to control the operation of audio module 1-6. The specific operation process comprises: the first microprocessor 1-2 or the second microprocessor 1-4 sending a control signal for the audio module 1-6 to control the operational data of the audio module 1-6. Herein, the operational data of the audio module 1-6 comprises at least one of the following: volume, timbre, playback mode and playback track switching, etc.

In some embodiments, since the first microprocessor 1-2 is mainly responsible for the overall control of each electrical device of the front part 1 (such as the sleep signal received from the user), and many of the controls of the audio module 1-6 are controlled according to user's instructions. The first microprocessor 1-2 is provided with an interface for receiving the user instructions, therefore, in order to ensure control effect of the audio module 1-6, it is preferred to use the first microprocessor 1-2 to control the operation of the audio module 1-6 (as shown in FIG. 1J and FIG. 1P).

FIG. 1L is a block diagram of a circuit connection for the audio module 1-6 in a twelfth embodiment of the present disclosure.

In some embodiments, as shown in FIG. 1L, the audio module 1-6 is provided with an audio control interface 1-6-1 and an audio transport interface 1-6-2. The audio control interface 1-6-1 is connected to the first microprocessor 1-2 or the second microprocessor 1-4, and the first microprocessor 1-2 or the second microprocessor 1-4 performs data communication with the audio module 1-6 through the audio control interface 1-6-1 and controls the operational data of the audio module 1-6. The audio transport interface 1-6-2 is connected to the system controller 2-1, and the system controller 2-1 performs audio data transmission with the audio module 1-6 through the audio transport interface 1-6-2.

During specific implementation, the first microprocessor 1-2 or the second microprocessor 1-4 is used to control the operational data of audio module 1-6, and the system controller 2-1 is used to send the audio data to the audio module 1-6 and controls the audio module 1-6 to play the audio data through the operational data of the audio module 1-6 fed back by the first microprocessor 1-2 or the second microprocessor 1-4. Alternatively, the audio module 1-6 sends the captured audio data to the system controller 2-1 through the audio transport interface 1-6-2 for processing. Herein, the audio module 1-6 comprises: Digital MIC (Microphone) for capturing external sounds and Audio PA (audio player) for playing audio Data, as shown in FIG. 1P.

Through the above solution, the first microprocessor 1-2/the second microprocessor 1-4 is used in combination with the system controller 2-1 to jointly control the audio module 1-6 to play audio, which can reduce the number of connection circuits between the audio module 1-6 and the system controller 2-1, so that the operation control effect of audio module 1-6 is better.

FIG. 1M shows a block diagram of a circuit structure for a thirteenth embodiment of the present disclosure.

In some embodiments, as shown in FIG. 1M and FIG. 1P, the rear part 2 further comprises a battery management module 2-3 through which the battery 2-2 is connected to the system controller 2-1, the battery management module 2-3 manages and controls the battery 2-2 according to a battery management signal sent from the system controller 2-1.

During specific implementation, the battery management module 2-3 (for example, PMICs) controls data communication with the system controller 2-1 through a SPMI interface (System Power Management Interface, system power management interface). The battery management module 2-3 sends some data (for example, power) of the battery 2-2 to the system controller 2-1 through an INT (interface) interface. In addition, the system controller 2-1 may also send a reset signal to the battery management module 2-3 through a RESET interface, so that the battery management module 2-3 can manage the battery 2-2 to complete the reset operation based on the reset signal.

Through the above solution, adding the battery management module 2-3, so that the system controller 2-1 can better manage and control the battery 2-2.

FIG. 1N shows a block diagram of a circuit structure for a fourteenth embodiment of the present disclosure.

In some embodiments, as shown in FIG. 1N and FIG. 1P, the rear part 2 further comprises: a wireless communication module 2-4 connected to the system controller 2-1. The system controller 2-1 is used to control operational data of the wireless communication module 2-4.

During specific implementation, the wireless communication module 2-4 comprises at least one of the following: Bluetooth module, WIFI module, ZigBee module, etc. Through the wireless communication module 2-4, it can receive wirelessly sent data and send the received data to the system controller 2-1 for processing; it can also send the data sent by the system controller 2-1 to the corresponding receiver wirelessly.

Through the above solution, setting the wireless communication module 2-4, so that the extended reality device has more comprehensive functions, and can perform wireless communication with other devices based on the wireless communication module 2-4, making it convenient for users to use.

FIG. 1O shows a block diagram of a circuit structure for a fifteenth embodiment of the present disclosure.

In some embodiments, as shown in FIG. 1O and FIG. 1P, the rear part 2 further comprises: an external device interface 2-5 which is connected to the system controller 2-1 and used to connect to an external electrical device.

During specific implementation, the external device interface 2-5 comprises at least one of the following: USB (Universal Serial Bus) interface, IEEE 1394 interface, VGA (Video Graphics Array) interface, DVI (Digital Visual Interface) interface, HDMI (High Definition Multimedia Interface) interface, COM (cluster communication port serial communication) interface and USB Type-C interface. In some embodiments, the external device interface 2-5 is preferably a USB interface (as shown in FIG. 1P).

Through the above solution, setting at least one external device interface 2-5 in the rear part 2 of the extended reality device, wired data communication can be performed with the external device through the external device interface 2-5, so that the functions of the extended reality device richer and more convenient for users to use.

Based on the same inventive concept, this embodiment proposes a control method for an extended reality device, which is applied to the extended reality device described in each of the above embodiments. The extended reality device comprises: a front part and a rear part.

FIG. 2 shows a flowchart of the control method of the extended reality device of embodiments of the present disclosure.

As shown in FIG. 2, the method comprises: Step 201: supplying power to a system controller configured in the rear part and a display module configured in the front part using a battery configured in the rear part. Step 202: sending display data to the display module through the system controller. Step 203: processing the display data using the display module, to obtain an extended reality image, and displaying the extended reality image.

During specific implementation, setting the display module in the front part, setting the system controller and the battery in the rear part, supplying power to the overall electrical device using the battery, and controlling the display module through the system controller, so that the display module can perform extended reality display in the front part.

Through the above solution, transferring the system controller and battery to the rear part setting, so that the weight of the front part of the extended reality device is significantly reduced, and the thickness of the front part is significantly reduced, so that the extended reality device can ensure the display effect of the extended reality image of the display module, at the same time, the weight balance effect of the extended reality device is better, and the overall aesthetic effect is effectively improved.

It should be noted that the method of embodiment of the present disclosure can be executed by a single device, such as a computer or server, etc. The method of the embodiment can also be applied in a distributed scenario and completed by a plurality of devices cooperating with each other. In this distributed scenario, one of the multiple devices may only execute one or more steps in the method of embodiment of the present disclosure, and the plurality of devices will interact with each other to complete the method.

It should be noted that some embodiments of the present disclosure are described above. Other embodiments are within the scope of the attached claims. In some cases, actions or steps documented in claims may be executed in a different order than in the embodiments described above and still achieve the desired result. In an addition, processes depicted in the drawings do not necessarily require the specific order shown, or sequential order, to achieve desirable result. In certain implementations, multitasking and parallel processing are also possible or may be advantageous.

To simplify illustration and discussion, and so as not to obscure the present embodiments, well-known power supply/ground connection of integrated circuit (IC) chip and other components may or may not be shown in the drawings provided. In an addition, devices may be shown in block diagram form in order to avoid obscuring the present embodiments, and this also takes into account the fact that the details regarding the implementation of these block diagram devices are highly dependent on the platform of embodiments of the present disclosure. (i.e., these details should be completely within the understanding of those skilled in the art). In a case that specific details (for example, circuits) are expounded to describe the exemplary embodiments of the present disclosure, it will be apparent to one skilled in the art that the embodiments of the present disclosure can be implemented in the absence of these specific details or in the case of changes in these specific details. Accordingly, these descriptions should be considered illustrative rather than restrictive.

Although the present disclosure has been described in connection with its specific embodiments, many substitutions, modifications and variations of these embodiments will be apparent to those of ordinary skill in the art according to the foregoing description. For example, other memory architectures (such as dynamic RAM (DRAM)) may use the embodiments discussed.

Those of ordinary skill in the art should understand that the above discussion of any embodiments is only illustrative and is not intended to imply that the scope of the present disclosure (comprising Claims) is limited to these examples; under the idea of the present disclosure, the above embodiments or different embodiments or the technical features in different embodiments can also be combined, the steps can be implemented in any order, and there are many other variations of the different aspects of the present disclosure as described above, which are not provided in detail for the sake of brevity.

The embodiments of the present disclosure are intended to cover all such alternatives, modifications and variations that fall within the broad scope of the appended claims. Therefore, any omissions, modifications, equivalent substitutions, improvements, and the like that are made within the spirit and principles of the embodiments of the present disclosure shall be included in the protection scope of the present disclosure.

We claim:

1. An extended reality device, comprising: a front part and a rear part;

the front part comprising:

a display module, configured to display extended reality image;

an image capturing module connected to a system controller and configured to be controlled by the system controller to collect image information; and a second microprocessor, which is provided with an image capturing operation interface and a second system control interface;

the rear part comprising:

the system controller connected to the display module and configured to control operation of the display module; and a battery connected to the system controller and configured to supply power to each electrical device, wherein the image capturing operation interface is connected to the image capturing module, and the second microprocessor controls operational data of the image capturing module through the image capturing operation interface; and the second system control interface is connected to the system controller, the system controller controls operational data of the second microprocessor through the second system control interface.

2. The extended reality device of claim 1, wherein the front part further comprises:

a first microprocessor provided with a display operation interface and a first system control interface;

wherein the display operation interface is connected to the display module, the first microprocessor controls operational data of the display module through the display operation interface;

wherein the first system control interface is connected to the system controller, the system controller controls operational data of the first microprocessor through the first system control interface.

3. The extended reality device of claim 2, wherein the display module is provided with a display control interface and a display transport interface;

wherein the display control interface is connected to the display operation interface of the first microprocessor, the first microprocessor performs data communication with the display control interface through the display operation interface and controls operational data of the display module; and wherein the display transport interface is connected to the system controller, the system controller sends display data through the display transport interface, for the display module to display the display data.

4. The extended reality device of claim 3, wherein the image capturing module is provided with a capturing control interface and an image transport interface;

wherein the capturing control interface is connected to the image capturing operation interface of the second microprocessor, the second microprocessor performs data communication with the capturing control interface through the image capturing operation interface and controls operational data of the image capturing module; and wherein the image transport interface is connected to the system controller, the system controller receives image information collected by the image capturing module through the image transport interface.

5. The extended reality device of claim 4, wherein the image capturing module comprises at least one of the following:

a tracking camera, a depth camera, or a perspective camera.

6. The extended reality device of claim 2, wherein the front part further comprises:

a sensor connected to the first microprocessor or the second microprocessor, and configured to control operational data of the sensor through the first microprocessor or the second microprocessor.

7. The extended reality device of claim 2, wherein the front part further comprises:

an audio module connected to the first microprocessor or the second microprocessor, and configured to control operational data of the audio module through the first microprocessor or the second microprocessor.

8. The extended reality device of claim 7, wherein the audio module is provided with an audio control interface and an audio transport interface;

wherein the audio control interface is connected to the first microprocessor or the second microprocessor, and the first microprocessor or the second microprocessor performs data communication with the audio module through the audio control interface and controls the operational data of the audio module; and wherein the audio transport interface is connected to the system controller, and the system controller performs audio data transmission with the audio module through the audio transport interface.

9. The extended reality device of claim 1, wherein the rear part further comprises:

a battery management module through which the battery is connected to the system controller, wherein the battery management module manages and controls the battery according to a battery management signal sent from the system controller.

10. The extended reality device of claim 1, wherein the rear part further comprises:

a wireless communication module connected to the system controller, wherein the system controller is used to control operational data of the wireless communication module.

11. The extended reality device of claim 1, wherein the rear part further comprises:

an external device interface connected to the system controller and used to connect to an external electrical device.

12. A method for control of an extended reality device, wherein the extended reality device comprises: a front part and a rear part, the method comprising:

supplying power to a system controller configured in the rear part and to a display module, an image capturing module and a second microprocessor configured in the front part, using a battery configured in the rear part;

connecting the image capturing module to the system controller and controlling the image capturing module by the system controller to collect image information;

controlling operational data of the image capturing module using the second microprocessor, wherein the second microprocessor is provided with an image capturing operation interface and a second system control interface;

connecting the image capturing operation interface to the image capturing module, and controlling operational data of the image capturing module through the image capturing operation interface by the second microprocessor;

connecting the second system control interface to the system controller, and controlling operational data of the second microprocessor through the second system control interface by the system controller;

sending display data to the display module through the system controller; and processing the display data using the display module, to obtain an extended reality image, and displaying the extended reality image.

13. The method of claim 12, further comprising:

controlling operational data of the display module using a first microprocessor configured in the front part.

14. The method of claim 12, further comprising:

controlling operational data of a sensor configured in the front part through a first microprocessor or a second microprocessor configured in the front part.

15. The method of claim 12, further comprising:

controlling operational data of an audio module configured in the front part through a first microprocessor or a second microprocessor configured in the front part.

16. A non-transitory computer readable storage medium having a computer program stored thereon which is executable by a processor to implement acts comprising:

supplying power to a system controller configured in a rear part of an extended reality device and to a display module, an image capturing module and a second microprocessor configured in a front part of the extended reality device, using a battery configured in the rear part;

connecting the image capturing module to the system controller and controlling the image capturing module by the system controller to collect image information;

controlling operational data of the image capturing module using the second microprocessor, wherein the second microprocessor is provided with an image capturing operation interface and a second system control interface;

connecting the image capturing operation interface to the image capturing module, and controlling operational data of the image capturing module through the image capturing operation interface by the second microprocessor;

connecting the second system control interface to the system controller, and controlling operational data of the second microprocessor through the second system control interface by the system controller;

sending display data to the display module through the system controller; and processing the display data using the display module, to obtain an extended reality image, and displaying the extended reality image.

* * * * *